Patented June 9, 1936

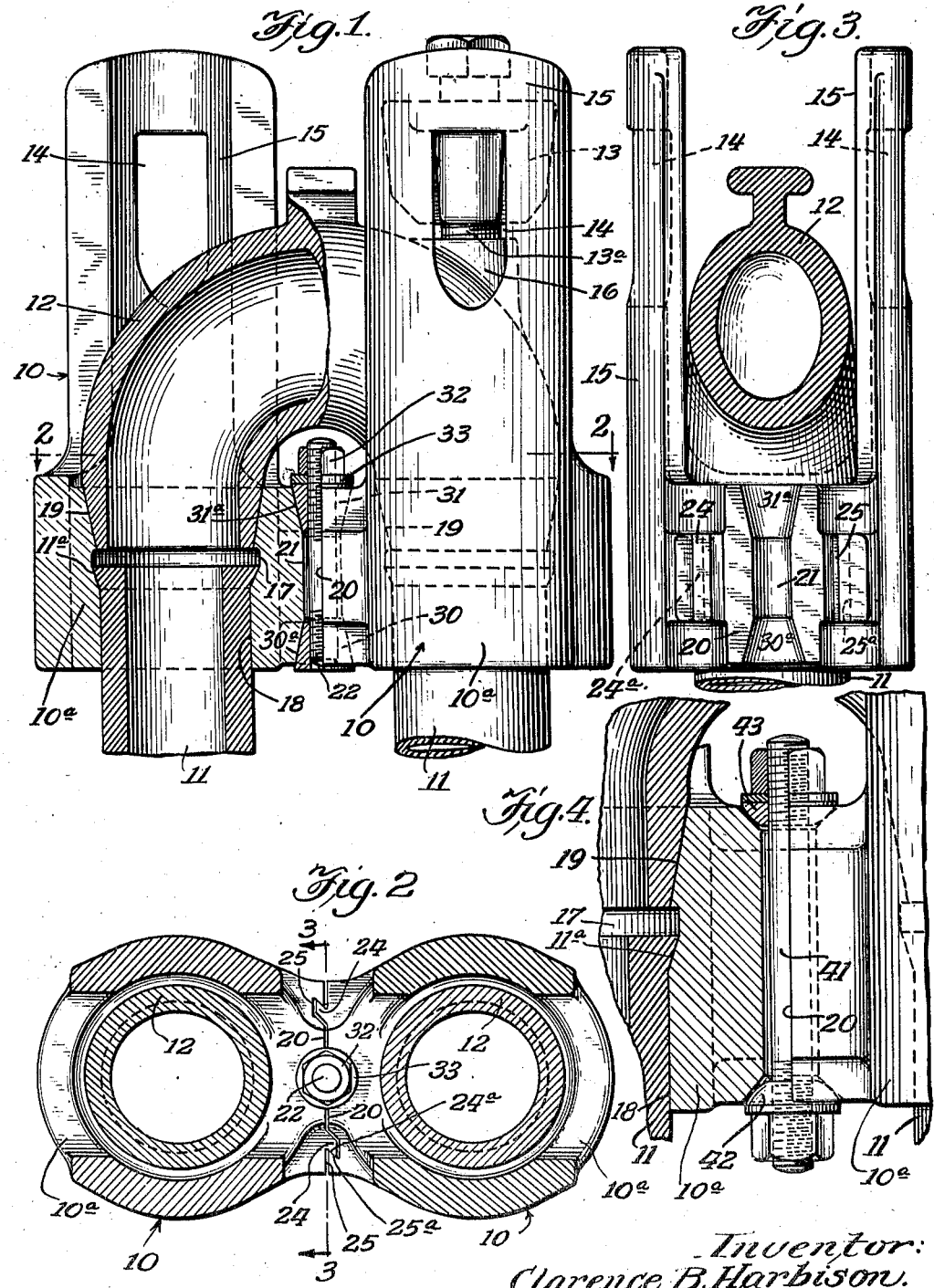

2,043,436

UNITED STATES PATENT OFFICE 2,043,436

RETURN BEND FITTING

Clarence B. Harbison, Lima, Ohio, assignor to The Ohio Steel Foundry Company, Lima, Ohio, a corporation of Ohio Application June 7, 1934, Serial No. 729,411

6 Claims. (Cl. 285—20)

This invention relates to improvements in return bend fittings for oil refineries or the like, and has for its principal object to provide a novel method of detachably connecting adjacent pairs of separable pipe-end housings.

My invention is particularly adapted for use in return bend fittings in which the ends of the still tubes are "rolled" into their respective housings for permanent connection therewith. During the rolling operation it is desirable to hold the two associated housings rigidly in exact alignment with each other, but after the tubes have been seated in their housings, it is desirable to afford a limited amount of lateral play between the housings so that the U-piece or bend, which is applied to the outer ends of the housings, may find its proper center with respect to the housings. This is desirable because the U-pieces are usually interchangeable, and the distance between their end seating surfaces is likely to vary somewhat.

The invention may best be understood by reference to the accompanying drawing, in which Fig. 1 is a side view of a return bend fitting constructed in accordance with my invention, with one of the two housings shown in vertical section, and with its U-piece locking device omitted.

Fig. 2 is a top plan view of the fitting shown in Fig. 1 with the U-piece and both of its locking devices removed.

Fig. 3 is a view in part section showing the abutting inner face of one of the housings illustrated in Figs. 1 and 2, but with the securing bolt removed.

Fig. 4 is a detail fragmentary view similar to a part of Fig. 1, but showing a modified form of securing bolt that may be employed.

Referring now to details of the embodiments of my invention illustrated in the drawing, the form of return bend fitting illustrated in Figs. 1 2 and 3 has the same general arrangement utilized in fittings of this type, consisting of two housings 10, 10 each connected to the ends of adjacent tubes 11, 11 and arranged so that the ends of the tubes are connected by U-piece 12 having its opposite ends seated in said housings in alignment with the ends of said tubes, as shown. The U-piece 12 is detachably secured in assembled position by any suitable means such as a pair of set lock members 13, 13, one of which is shown in Fig. 1, engaging slots 14, 14 formed in the upright walls 15, 15 of the housings. Said set lock members may be provided with set screws 13ª engaging shoulders 16 on the upper part of the U-bend in alignment with their open ends so as to hold them securely in place.

In the form shown, each tube 11 is secured in the base 10ª of its respective housing 10 by means of an enlarged shoulder portion 11ª which is rolled into an annular groove 17 formed in the tube aperture 18 of each housing. The portion of the tube aperture above said tube is flared outwardly to form a seat 19 which is adapted to be engaged by the adjacent end of the U-piece 12.

Referring now more particularly to the novel features of my invention, it will be observed that the two housings 10, 10 are separable from each other along a generally vertical median plane, and the base portions 10ª, 10ª of said housings are provided with plane abutting faces 20, 20 along adjacent sides. A vertically extending semi-cylindrical groove 21 is formed along the center of each of said abutting faces. When the housings are in abutting relation to each other as indicated, in Figs. 1 and 2, grooves 21, 21 are in registering relation with each other so as to form an opening within which a bolt 22 may be fitted.

The plane surfaces 20, 20 are also provided with interlocking means arranged to detachably secure the housings together. In the form shown, the interlocking means consists of a vertically elongated rib or spline 24 projecting from each of the abutting faces 20 at one side of its bolt groove 21, said rib being offset at an angle from its adjacent face as clearly shown in Fig. 2, and fitting in a similarly shaped recess 25 formed in the opposite face 20 of the other housing. A similar rib 24 and recess 25 are formed on the abutting faces at the opposite side of the central bolt opening, but in mutually reversed relation, so that the two housings are identical, each having a projecting rib 24 at one side of its respective belt opening and a correspondingly shaped recess 25 at the opposite side of its bolt opening, all as clearly shown in Fig. 2. From this latter figure it will be observed that the outer angular face 24ª of each rib 24 is adapted to engage a similarly angular face 25ª of its opposed recess 25 when the parts are in interlocked position shown in Figs. 1 and 2, so that the housings cannot be withdrawn laterally from each other. Said housings may, however, be parted from each other, or reassembled again, by vertical or axial movement relative to each other.

The bolt 22 is arranged to hold the housings in horizontal alignment with each other, with the interlocking surfaces in engagement. The interengaging ribs 24 and recesses 25 are preferably formed with a working clearance between the engaging surfaces thereof as indicated in Fig. 2, so as to provide limited lateral play between said housings. The bolt 22, however, is provided with means capable of adjustment in one position to force the housings apart to the maximum distance permitted by the inter-engaging surfaces 24ª and 25ª of the interlocking ribs and grooves 24 and 25. As shown in Fig. 1, this is accomplished by means of tapered sleeves 30 and 31 at opposite ends of the bolt 22, the lower tapered sleeve 30 being threaded on the bolt to form a head thereof, and the upper sleeve 31 being slidable on the bolt and secured thereon by means of the usual nut 32 and washer 33. As will be seen in Fig. 3, the upper and lower ends of the bolt grooves 21 have tapered surfaces at 30ª and 31ª to cooperate with the tapered sleeves 30 and 31 on the bolt.

In the modified form of bolt securing means shown in Fig. 4, the bolt 41 is provided with a pair of washers 42, 43 which have considerably less taper than the sleeves 30 and 31 shown in Fig. 1, but it will be observed that the principle of operation of the two forms of bolt shown in Figs. 1 and 4 are substantially the same.

The use and operation of the connecting device above described will now be more clearly understood.

When it is desired to hold the two associated housings 10, 10 in exact and rigid alignment with each other, as for instance, when the tubes are being rolled into their respective housings, or when the tubes are to be cleaned by reaming in the usual manner, the bolt 22 (or 41) is tightened so as to force the housings apart and rigidly engage the interlocking ribs 24 in their respective recesses 25. Upon completion of the rolling or cleaning operation, however, the bolt 22 (or 41) is loosened, so as to afford a limited amount of lateral play between the housings. This permits the U-pieces, which are usually interchangeable, to readily find their own centers as they are applied to each pair of housings, without marring the seats in the latter, or putting an undue strain on the U-pieces.

Although I have illustrated and described certain embodiments of my invention, it will be understood that I do not wish to be limited to the exact construction shown and described, but that various changes and modifications may be made without departing from the spirit and scope of my invention as defined in the appended claims.

I claim:

1. In a return bend fitting, a pair of separable housings having abutting faces provided with mutually interlocking means arranged to afford limited lateral movement of said housings relative to each other, and means for optionally forcing said housings to the limit of their permissible lateral movement so as to hold them in rigid relation with each other.

2. In a return bend fitting, a pair of separable housings having abutting faces provided with mutually interlocking means arranged to afford limited lateral movement of said housings relative to each other, and detachable means for restraining said interlocking means against displacement, said detachable means being optionally adjustable in one position to force said housings to the limit of their permissible lateral movement.

3. In a return bend fitting, a pair of separable housings each having abutting faces provided with a pair of similar mutually interlocking means arranged to afford limited lateral movement of said housings relative to each other, and means for optionally forcing said housings to the limit of their permissible lateral movement so as to hold them in rigid relation with each other.

4. In a return bend fitting, a pair of separable housings having abutting faces provided with mutually interlocking means arranged to afford limited lateral movement of said housings relative to each other, a bolt disposed along and between the fitting faces of said housings, and wedge means carried by said bolt and adjustable thereby for forcing said housings to the limit of their permissible lateral movement so as to hold them in rigid relation with each other.

5. In a return bend fitting, a pair of separable housings having abutting faces provided with registering recesses disposed longitudinally of their meeting faces, said abutting faces also being provided with a pair of similar mutually interlocking means at opposite sides of said recesses arranged to afford limited lateral movement of said housings relative to each other, and a bolt fitting in said registering recesses for restraining said interlocking means against displacement.

6. In a return bend fitting, a pair of separable housings having abutting faces provided with registering recesses disposed longitudinally of their meeting faces, said abutting faces also being provided with a pair of mutually interlocking means at opposite sides of said recesses arranged to afford limited lateral movement of said housings relative to each other, and a bolt fitting in said registering recesses for restraining said interlocking means against displacement, said bolt also having wedge mean for optionally forcing said housings to the limit of their permissible lateral movement so as to hold them in rigid relation with each other.

CLARENCE B. HARBISON.